(12) United States Patent
Chen et al.

(10) Patent No.: US 7,218,358 B2
(45) Date of Patent: May 15, 2007

(54) METHOD AND APPARATUS FOR CALIBRATING COLOR TEMPERATURE OF COLOR DISPLAY DEVICES

(75) Inventors: Yung-Chih Chen, Miao-Li County (TW); Tun-Chiech Yang, Miao-Li County (TW)

(73) Assignee: Coretronic Corporation, Chu Nan, Miao-Li County (TW)

( * ) Notice: Subject to any disclaimer, the term of this patent is extended or adjusted under 35 U.S.C. 154(b) by 512 days.

(21) Appl. No.: 10/866,666

(22) Filed: Jun. 15, 2004

(65) Prior Publication Data

US 2005/0275912 A1    Dec. 15, 2005

(51) Int. Cl.
*H04N 9/73*    (2006.01)
(52) U.S. Cl. ............... 348/658; 348/191; 345/590
(58) Field of Classification Search .......... 348/656, 348/657, 658, 189, 191; 382/167; 358/518; 345/589–591
See application file for complete search history.

(56) References Cited

U.S. PATENT DOCUMENTS

| | | | |
|---|---|---|---|
| 5,619,427 A | 4/1997 | Ohkubo | |
| 5,791,781 A | 8/1998 | Park et al. | |
| 5,909,291 A * | 6/1999 | Myers et al. | 358/523 |
| 6,677,958 B2 * | 1/2004 | Cottone et al. | 345/589 |
| 6,853,387 B2 * | 2/2005 | Evanicky et al. | 345/690 |

* cited by examiner

*Primary Examiner*—Michael H. Lee
(74) *Attorney, Agent, or Firm*—Birch, Stewart, Kolasch & Birch, LLP

(57) ABSTRACT

A method and apparatus for calibrating color temperature of color display devices aims to calibrate output bases of RGB three original color lights of a color display device so that different color display devices can radiate the same color temperature in the same color temperature settings. The method of the invention uses a colorimeter to obtain current chromaticity value radiated from the color display device in a standard color representation system and in the condition of known output bases of the current three original color light signals, and through calculation to obtain the proportional relationship of the current radiating color temperature and an objective color temperature in the same standard color representation system, and based on which to derive the output bases of the required three original color light signals corresponding to the objective color temperature to be calibrated. The results are written through the apparatus into a color profile of the color display device.

16 Claims, 6 Drawing Sheets

METHOD AND APPARATUS FOR CALIBRATING COLOR TEMPERATURE OF COLOR DISPLAY DEVICES

FIELD OF THE INVENTION

The present invention relates to a method and apparatus for calibrating color temperature of color display devices and particularly to a method and apparatus for calibrating output bases of three original color light signals (RGB) from the color display devices and writing the calibration results to a color profile belonging to the color display devices.

BACKGROUND OF THE INVENTION

Color input signals of color display devices (abbreviated display devices hereinafter) such as liquid crystal display (LCD) devices or conventional cathode ray tube (CRT) display devices consist of digital signals of three original colored lights that are red (R), green (G) and blue (B) (called R,G,B hereinafter). Input and output are indicated by scales of 0–255. Applying color light mixing principle, based on the three original color lights and ratio control of different luminance, millions of different readings may be obtained. The color temperature relates to the energy dispersion relationship of the R,G,B color lights. The display device can radiate different color temperatures through firmware by setting the R,G,B output bases. These bases are fixed once the firmware is written and hardwired. According to physics, the color temperature represents the spectrum characteristics of an illuminant. When the spectrum distribution of an illuminant is same as the radiation of a black body, the absolute temperature (K°) corresponding to the black body radiation is called the color temperature of the illuminant. There are several preset color temperatures for the general display devices, such as 9300 K°, 6500 K°, 5000 K°, etc. They generally are indicated by $D_{93}$, $D_{65}$, $D_{50}$.

Because of different output and input devices, digital image data may be unchanged, but different color display methods can generate different display results. This makes color reproduction a big challenge. For instance, in the color reproduction printing based on three colors C (cyan), M (magenta) and Y (yellow), how can an image file achieve the same printed results through different types of printing facilities? How can it display the same color on different brands of display devices (based on RGB for color reproduction)?

To resolve these problems of different facilities or color reproduction, a color profile mode must be defined and remain the same when different devices are used. It is called the standard reference color gamut. The RGB color or CMY color of different devices can find a corresponding color in the standard reference color gamut so that color conversion among different devices may be maintained without distortion. In 1931, Commission Intornation De'l E'clairage (CIE) or ICI (International Commission on Illumination) published a physical measurement method that uses numbers to quantify color space of various colors. For instance, CIE-R.G.B coordinates (CIE1932 standard chromaticity observer) were generated by matching color and experiments. CIE L*a*b* and CIE1931 Yxy color representation methods are the frequently used color spaces. The color management system (CMS) of different devices require a color profile defined by accurate color reproduction characteristics to meet the color conversion requirements of different display devices. The color profile generally is stored in each display device through a firmware. The techniques for generating color profile can be found in prior arts such as U.S. Pat. No. 5,619,427.

Color is a reflection of light sensed by human eye observation. With illuminants of different wavelengths or different color temperature, even the display device of the same RGB output bases will give human eyes different color sense.

The technique for calibrating color temperature of the display device based on the color temperature of the environmental illuminant can be found in U.S. Pat. No. 5,791,781 entitled "Method of determining color temperature for color display device". It mainly uses two different patch sets to determine the color temperature of the display device. One set consists of a plurality of patches that displays gray scale in various illuminant elements. Another set consists of a plurality pairs of patches of the same color in different spectrums. This technique, after taking into account environmental illuminant conditions, can determine the color characteristic data of the color temperature of a display device in the CMS mode and provides required color temperature information to generate the required color profile without using the colorimeter. However, it does not provide any suggestions to ensure that the color temperature radiated from the display device can conform to standards.

The known methods for calibrating the color temperature of display devices mostly are through the functions provided by hardware and firmware (such as the firmware in the display device that stores the color profile and a calibration button), or through software (such as the image editing software Photoshop). In fact, every set of display devices manufactured by the same vendor in the same year has its own color gamut because of the different RGB phosphorescent agents used. Hence, it cannot be guaranteed that the radiated color temperature of the display devices of the same brand or model that use the same color profile can reach the standard color temperature.

The hardware functions of a good display device allow users to calibrate the color temperature by themselves. It is even possible to adjust the individual RGB intensity. However, for a display device that does not offer color-calibrating functions, calibration of the color temperature has to be accomplished through software. For instance, for a display device which has color temperature 9300 K° (blue-oriented), to calibrate to 5000 K° (red-oriented),the calibration method is to reduce the output base of the blue light (B). Hence when input of blue is 255, maximum output of green color is 235, and output of blue color should be no greater than 219. With the green and blue color reduced, the display device is red-oriented and can reach the desired color temperature. Although the color temperature reaches the desired goal, maximum output of the green and blue light decreases. As the luminance is not calibrated in a corresponding manner, total light intensity and color diminish.

SUMMARY OF THE INVENTION

The primary object of the invention is to provide a method for calibrating color temperature of display devices that calibrates output bases of three original color light signals sent to the display devices to enable the color temperature radiated from the display devices close to a preset objective color temperature.

The method according to the invention basically is to find out a color indication value from a standard reference color gamut corresponding to the objective color temperature to be calibrated. Namely, to find out the color coordinate (called first color coordinate hereinafter) of the objective color temperature in the standard reference color gamut; then in the condition of the current output bases $R_2,G_2,B_2$ of the three original color lights of the display devices being known (i.e. the energy intensity of the three original color lights of the display device is controlled between 0–255), use a calorimeter to measure the current color temperature radiated from the display device, and obtain a color coordinate (called a second color coordinate) in the same standard reference color gamut corresponding to the current color temperature; then use a conversion matrix to transform the first color coordinate and the second color coordinate to two sets of tristimulus value (respectively called the first tristimulus value $[r_1, g_1, b_1]$ and the second tristimulus value $[r_2, g_2, b_2]$); based on the proportional relationship of the first and second tristimulus value $[r_1, g_1, b_1]$ and $[r_2, g_2, b_2]$ to derive the output bases $R_1,G_1,B_1$ of the three original color lights corresponding to the first color coordinate, and the difference of $R_1,G_1,B_1$ and $R_2,G_2,B_2$. If the difference exists, use the obtained $R_1,G_1,B_1$ to replace $R_2,G_2,B_2$, and repeat the foregoing steps to get a next new $R_1,G_1,B_1$ until the difference between the obtained $R_1,G_1,B_1$ and $R_2,G_2,B_2$ no longer exists or is within a selected range of tolerance. By means of the repetitive calculation of the RGB energy ratio, the required RGB output bases may be rapidly calibrated to reach the objective color temperature.

Another object of the invention is to provide an apparatus for calibrating the color temperature of display devices. The apparatus can rapidly calibrate the color temperature of the display devices and write the calibration results into the firmware of the display devices such as a color profile.

The apparatus according to the method of the invention includes a colorimeter to obtain the current color temperature radiated from a display device, a data processing unit to enter output bases $R_2,G_2,B_2$ of known three original color lights to the display device to be calibrated, and obtain a first color coordinate corresponding to the objective color temperature in the same standard reference color gamut, and a second color coordinate corresponding to the current color temperature, then perform processing based on the method set forth above to obtain the RGB output bases required to reach the calibrated objective color temperature, and a data writing unit to write the processed and obtained RGB output bases into the firmware of the display device.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
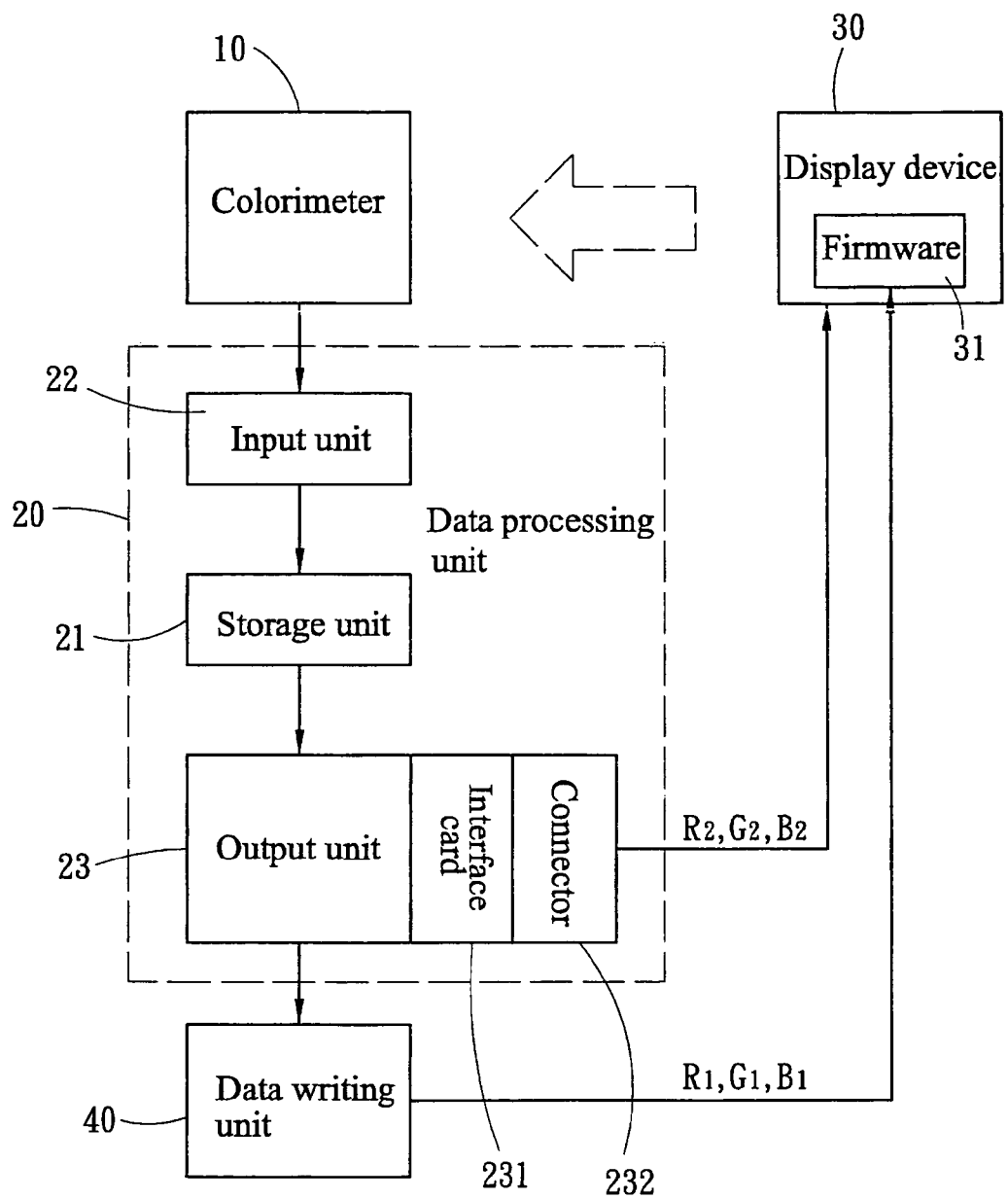
FIG. 1 is a functional block diagram of the apparatus of the present invention.

Please refer to FIG. 1 for the functional block diagram of an embodiment of the apparatus according to the method of the invention. The apparatus includes:

a calorimeter 10 which is a commonly used device to obtain the current color temperature radiated from a display device 30. During measurement, the display device 30 radiates red, green and blue color lights. Their color temperature are indicated by referring to color coordinates (called second color coordinate hereinafter) of a standard reference color gamut (such as CIE color space);

a data processing unit 20 to input known R,G,B output bases values $R_2,G_2,B_2$ to the display device 30 to be calibrated, and according to the objective color temperature to be calibrated to obtain a first color coordinate corresponding to the objective color temperature in the same standard reference color gamut. Then according to the method of the invention to process data of the first color coordinate and the second color coordinate to obtain the required RGB output bases values $R_1,G_1,B_1$ of the display device 30 to be calibrated to the objective color temperature; and a data writing unit 40 to write the obtained output bases values $R_1,G_1,B_1$ from the process into a firmware 31 of the display device 30.

In the preferred embodiment, the data processing unit 20 may be a computer with built-in processing programs, such as personal computer (PC), server or the like. The data processing unit 20 includes at least a storage unit 21 (such as memory, hard disk/driver, diskettes, or the like), an input unit 22 and an output unit 23. The input unit 22 includes keyboards, input interfaces and the like. The output unit 23 includes an interface card 231 for driving the display device 30 and other necessary elements for connecting the display device 30 such as a connector 232.

Figure 2:
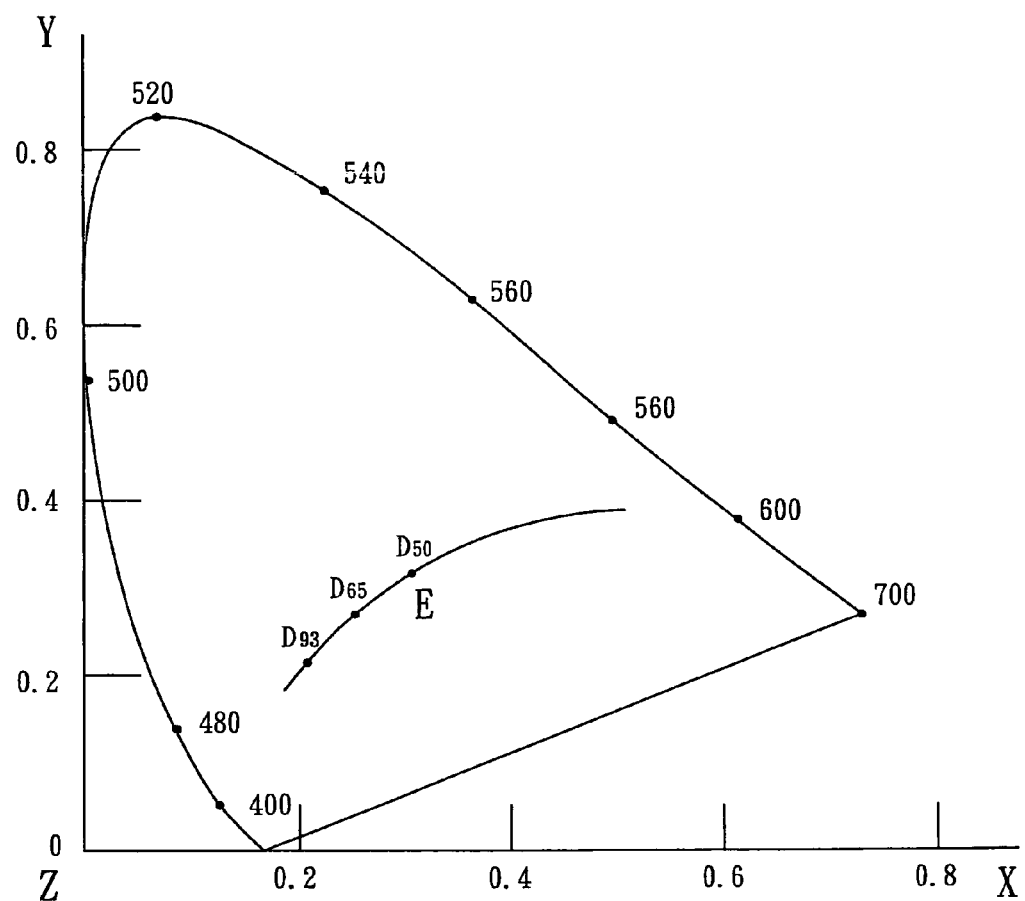
FIG. 2 is a CIE 1931 xyY chromaticity diagram.
Figure 3:
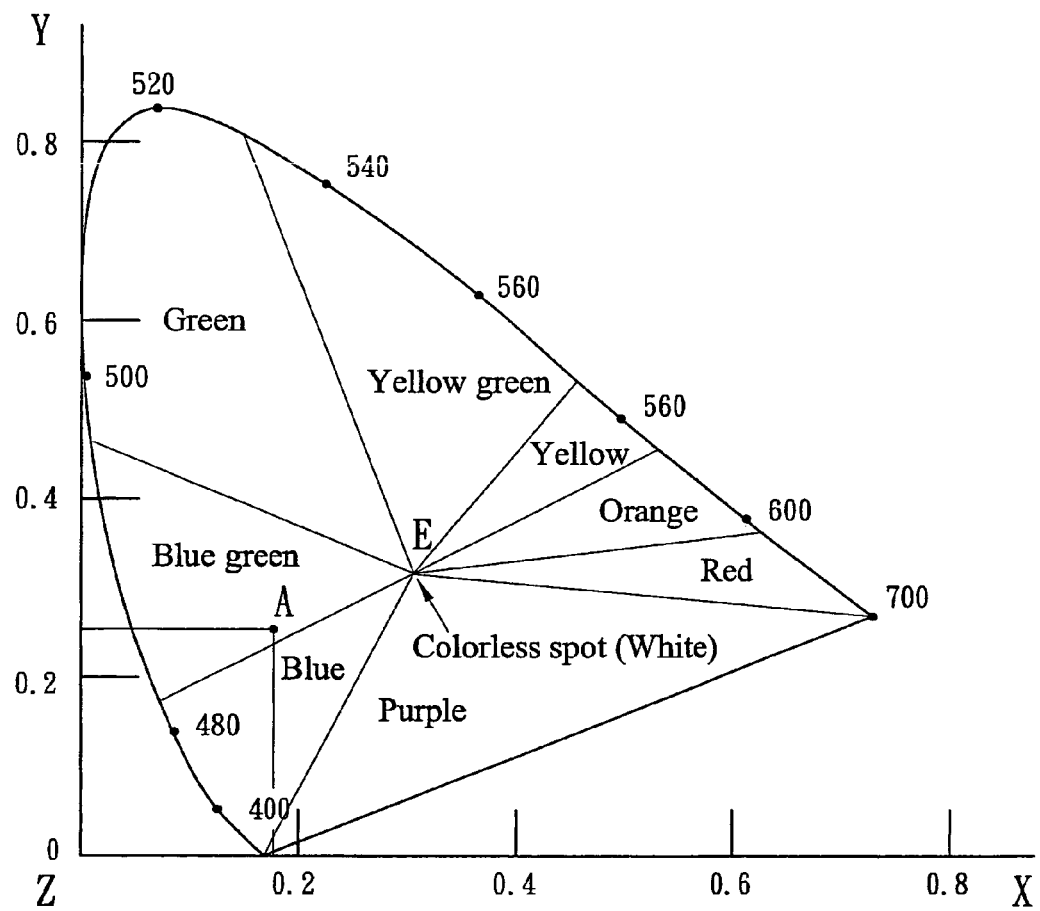
FIG. 3 is a CIE 1931 xyY chromaticity diagram showing different color gamut locations.

The storage unit 21 is mainly to store the standard reference color gamut data and results of the process. In an embodiment of the invention, a CIE 1931 xyY chromaticity diagram (referring to FIG. 2) is used as the standard reference color gamut, where X color coordinate corresponds to the ratio of the red light (R) in the three original color lights, Y color coordinate corresponds to the ratio of the green light (G), and Z color coordinate represents the luminance factor Y. The horseshoe shaped spectral trace shown in the drawing indicates the locations of various wavelengths. It can be seen that the red color waves concentrate on the lower right section, the green color waves concentrate on the upper section, and the blue color waves concentrate on the lower left section. The white light point E in the center has the lowest saturation. The saturation on the luminance trace has the highest saturation. To connect the wavelength points that represent different color lights on the spectral trace with the white light point E in the center of the chromaticity diagram, the chromaticity diagram can be divided into different color zones as shown in FIG. 3. Hence, in the event that the color coordinate x, y of a selected color has been calculated and obtained, its color characteristics may be clearly defined on the chromaticity diagram. For instance, the color coordinate of color C (cyan) is x=0.1902 and y=0.2302, and it is located on point A in the chromaticity diagram and in the blue and green color zone. Of course, different colors have different color coordinates and are located on different points in the chromaticity diagram. Thus, the point location of the chromaticity diagram represents the color characteristics of various colors. However, the color coordinate defines only color chromaticity without defining the luminance of the color. To define accurately a color, the characteristics of luminance also have to be indicated, which is the value of Y (luminance). Hence combining the color coordinate x, y and luminance Y can indicate the current corresponding color temperature. The CIE 1931 xyY chromaticity diagram also includes a color temperature (CT) curve which has a plurality of reference points corresponding to a selected color temperature, such as $D_{93}$, $D_{65}$, $D_{50}$, that may serve as the reference of x, y coordinates of the corresponding color temperature.

Figure 4:
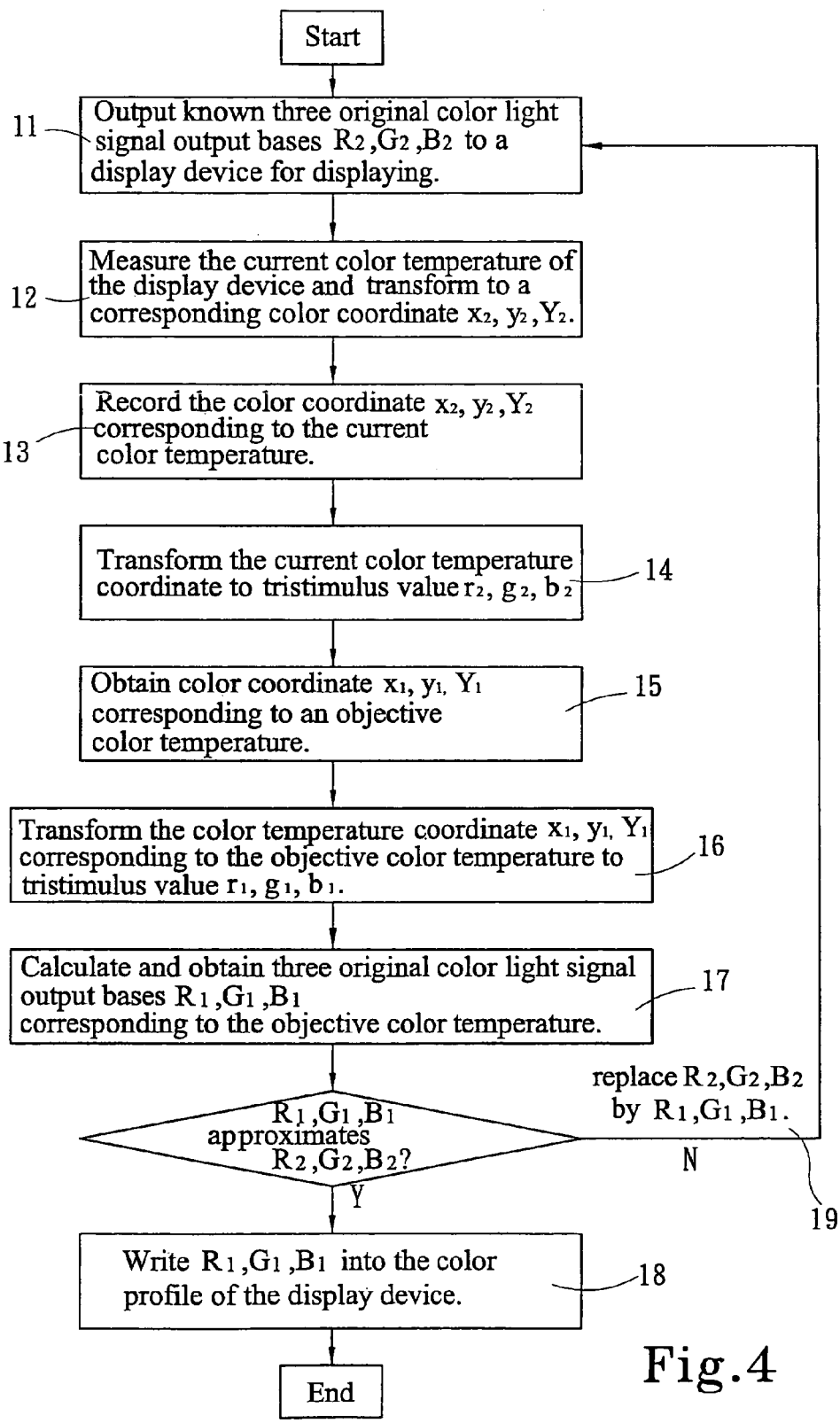
FIG. 4 is a flow chart showing the process procedures of the method of the invention.

Refer to FIG. 4 for the process procedures of calibrating the color temperature through the apparatus depicted above. The procedure includes the following steps:

1. Display RGB three original color light signals with known output bases (range from 0 to 255) $R_2$, $G_2$, $B_2$ on a display device 30;
2. measure the color temperature of the visible light radiated from the display device 30, and output color coordinates (called second color coordinates hereinafter and indicated by $x_2$, $y_2$) of the current color temperature and luminance $Y_2$ according to CIE 1931 xyY chromaticity diagram, namely the second color coordinates $x_2$, $y_2$ are the color coordinates in the condition of the three original color light output bases $R_2$, $G_2$, $B_2$ were known, and may be indicated by $[x_2, y_2\ Y_2|R_2, G_2, B_2]$;
3. record the color coordinates $[x_2, y_2\ Y_2|R_2, G_2, B_2]$ that correspond to the current color temperature in a storage unit 21 retrievable by a computer to become a current color temperature record;
4. transform the current color temperature record to a second tristimulus value $r_2$, $g_2$, $b_2$ through a conversion matrix $M_2$;
5. refer to CIE 1931 xyY chromaticity diagram to obtain a color coordinate (called first color coordinate hereinafter and indicated by $x_1$, $y_1$) corresponding to an objective color temperature (presumed to be $D_{65}$) to be calibrated and its luminance $Y_1$, and indicated by $[x_1, y_1\ Y_1]$;
6. transform the first color coordinate $[x_1, y_1\ Y_1]$ to a first tristimulus value $r_1$, $g_1$, $b_1$;
7. obtain output bases $R_1, G_1, B_1$ of three original color light signals corresponding to the objective color temperature by calculation according to the following equation (a) and through a linear ratio:

$$r_1/r_2 = R_1/R_2;\ g_1/g_2 = G_1/G_2;\ b_1/b_2 = B_1/B_2 \quad (a)$$

8. end the process and obtain the output bases $R_1, G_1, B_1$ and write into a color profile in the display device 30 when the output bases $R_2, G_2, B_2$ of the three original color light signals approximate the output bases $R_1, G_1, B_1$ of the three original color lights of the objective color temperature or is within an allowable tolerance (namely the prior known RGB three original color light signals with output bases (0–255) of $R_2, G_2, B_2$ and the output bases $R_1, G_1, B_1$ corresponding to the objective color temperature are within a preset allowable tolerance), otherwise proceed with the next step; and
9. replace the $R_2$, $G_2$, $B_2$ by the obtained $R_1, G_1, B_1$, and repeat the process set forth above.

The tristimulus value is the three-color stimulus value imitating the response of human eyes. It may be coupled with the color seen by the standard observer defined in the CIE standard illumination body $D_{50}$.

By means of the procedures set forth above, and by referring to the proportional relationship between the first tristimulus value $r_1$, $g_1$, $b_1$, and second tristimulus value $r_2$, $g_2$, $b_2$, the RGB output bases $R_1$, $G_1$, $B_1$ to reach the objective color temperature may be calculated and obtained. To make the calculated and obtained RGB output bases $R_1, G_1, B_1$ to allow the radiated color temperature of the display device 30 to reach a preset goal of color temperature, the step 8 depicted above further includes a comparison and determination step. Through repetitive comparisons of the tolerance of known output bases $R_2, G_2, B_2$ and the calculated output bases $R_1, G_1, B_1$, the output bases $R_2, G_2, B_2$ sent to the display device 30 may be re-calibrated until the tolerance is smaller than a preset range, then the process may be stopped. Thus an accurate output bases $R_2, G_2, B_2$ may be obtained. The allowable tolerance is set in advance, and is stored in the storage unit 21 of the data processing unit 20.

Another embodiment of method of the invention includes a fine tuning step to fine tune the obtained final output bases $R_2, G_2, B_2$ that is within a preset range of tolerance. This step dynamically calibrates by directly increasing or decreasing output of the output bases $R_2, G_2, B_2$ of the three RGB original color lights to the display device 30 and by directly referring to the relative positional relationship of the first color coordinate $x_1$, $y_1$ (i.e. the corresponding location of the objective color temperature in the CIE 1931 xyY chromaticity diagram) and the second color coordinate $x_2$, $y_2$ (i.e. the corresponding location in the CIE 1931 xyY chromaticity diagram of the color temperature radiated from the display device 30 in the condition of known output bases $R_2, G_2, B_2$).

Figure 5:
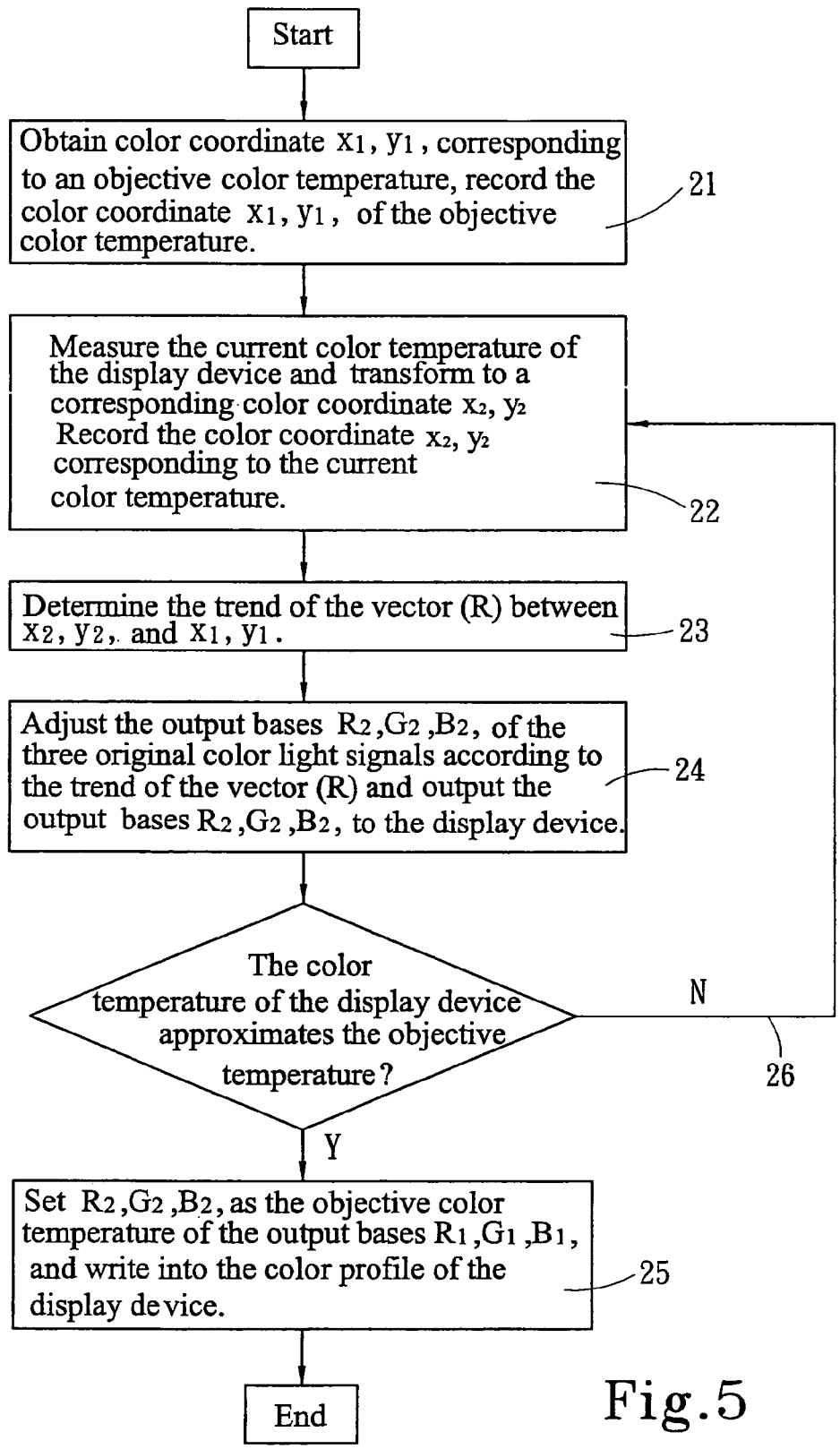
FIG. 5 is a flow chart showing the process procedures of another embodiment of the method of the invention.

Refer to FIG. 5 for the process procedures of another embodiment of the method, including:

1. Obtain a corresponding color coordinate (called first color coordinate $x_1$, $y_1$ hereinafter) in the CIE 1931 xyY chromaticity diagram of an objective color temperature (presumed to be $D_{65}$) to be calibrated, and store the first color coordinate $x_1$, $y_1$ in a storage unit 21;
2. measure the color temperature of the visible light radiated from the display device 30, obtain a current color coordinate (called second color coordinates $x_2$, $y_2$ hereinafter) in the CIE 1931 xyY chromaticity diagram corresponding to the measured one, and store the second coordinate $x_2$, $y_2$ in the storage unit 21;
3. use the first color coordinate $x_1$, $y_1$ as the new original point, and determine the vector trend of the line between the second coordinate $x_2$, $y_2$ and the new original point. The determination may be accomplished by coordinate calculation through the following equation (b), and the result is determined by referring vector $\vec{R}$ $$\vec{R} = \overrightarrow{(X_2 - X_1)(Y_2 - Y_1)} \quad (b)$$

4. calibrate output bases $R_2, G_2, B_2$ according to the vector $\vec{R}$ and R,G,B distribution relationship in the CIE 1931 xyY chromaticity diagram. Namely perform increasing or decreasing processes based on the output bases $R_2, G_2, B_2$ of the three original color light output to the display device 30;
5. stop processing and set the calibrated output bases $R_2, G_2, B_2$ as the RGB output bases $R_1, G_1, B_1$ of the objective color temperature; the output bases $R_1, G_1, B_1$ is written in the color profile of the display device 30.

Redo measurement of the color temperature of the display device 30 and determine whether the color temperature is close to the standard color temperature within a preset allowable tolerance; if negative, proceed the following step; and 6. output the calibrated output bases $R_2, G_2, B_2$ to the display device 30, and repeat the step 2.

Figure 6:
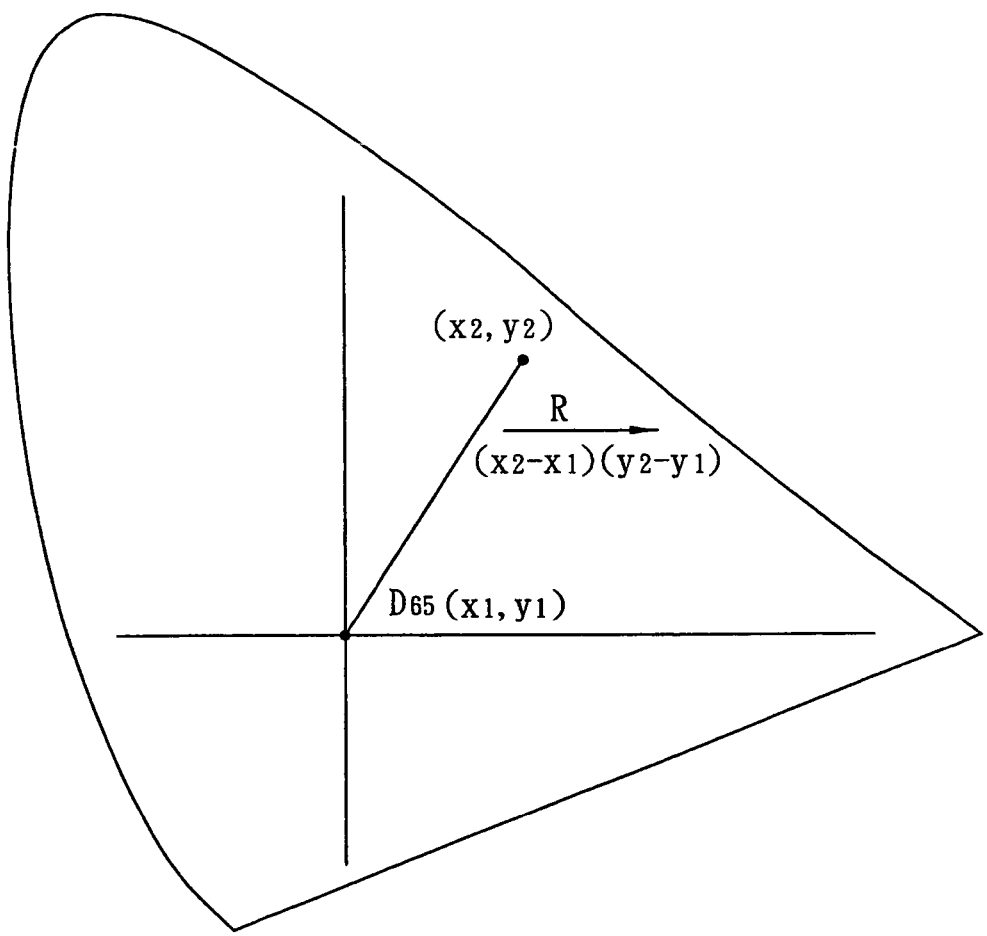
FIG. 6 is a chart showing the location relationship of color coordinates $x_1, y_1$ and $x_2, y_2$ of a fine-tuned embodiment.

An example is described as follow to illustrate the fine-tuning process. Assumed the objective color temperature to be calibrated is 6500 K° ($D_{65}$). A corresponding color coordinate in the CIE 1931 xyY chromaticity diagram is $x_1$, $y_1$. The corresponding color coordinate is $x_2$, $y_2$ in the CIE 1931 xyY chromaticity diagram for the measured color temperature radiated from the display device 30. The corresponding positional relationship and vector $$\vec{R}$$

are shown in FIG. 6. According to the trend of the vector $$\vec{R}$$

to fine tune the output bases $R_2, G_2, B_2$ by reducing the output bases $G_2, B_2$ of green light (G) and blue light (B). The fine-tuned output bases $R_2, G_2, B_2$ are output to the display device 30. Then retake the measurements of the color temperature of the display device 30 and verify whether it is close to the objective color temperature, then determine whether to repeat the fine-tuning process.

In summary, the invention can achieve the following effects:

The method according to the invention uses the fast processing capability of the data processing unit 20 (such as personal computer) and performs repetitive calibration of the R,G,B output bases of the display device 30, and writes the results into the color profile of the display device 30, hence can achieve fast and dynamic calibration.

By using the CIE 1932 xyY chromaticity diagram as the standard reference color gamut and processing transformation through the conversion matrixes M1 and M2, not only the R,G,B proportional relationship in the CIE 1931 xyY chromaticity diagram is covered, the luminance factor also is included. This further improves the calibration of the color temperature.

What is claimed is:

1. A method for calibrating color temperature of color display devices to calibrate output bases of three original color light signals to output to a color display device to allow the color temperature radiated from the display device to be proximate to a set objective color temperature, comprising the steps of:

A. outputting RGB three original color light signals with known second output bases that range from 0 to 255 to the color display device;

B. measuring the color temperature radiated from the color display device, and obtaining a second color coordinate and luminance in a standard reference color gamut corresponding to the measured current color temperature;

C. recording the second color coordinate in a storage unit retrievable by a computer;

D. transforming the second color coordinate to a second tristimulus value through a second conversion matrix;

E. obtaining a first color coordinate corresponding to an objective color temperature in the standard reference color gamut;

F. transforming the first color coordinate to a first tristimulus value through a first conversion matrix;

G. obtaining a first output bases of three original color light signals corresponding to the objective color temperature by calculation according to the following equation (a):

$$r_1/r_2 = R_1/R_2; \ g_1/g_2 = G_1/G_2; \ b_1/b_2 = B_{1/B2} \quad (a)$$

H. ending process when the second output bases approximate the first output bases within an allowable range, otherwise proceeding the next step; and I. replacing the second output bases by the first output bases and repeating the previous process.

2. The method of claim 1, wherein the standard reference color gamut is a CIE 1931 xyY chromaticity diagram.

3. The method of claim 1, wherein the allowable range is preset and stored in the storage unit of the computer.

4. The method of claim 1 further including a step of writing the first output bases into a color profile of the color display device.

5. The method of claim 1 further including a step of fine tuning to dynamically calibrate by directly increasing or decreasing output of the second output bases to the display device according to positional relationship of the first color coordinate and the second color coordinate in the standard reference color gamut.

6. The method of claim 5, wherein the fine tuning step includes:

I. using the first color coordinate as a new original point, and determining the vector trend according the direction between the new original point and the second color coordinate and through a coordinate calculation according to the following equation (b), and a resulting vector $$\vec{R}:$$

II.

$$\vec{R} = \overrightarrow{(x_2 - x_1)(y_2 - y_1)} \quad (b)$$

III. calibrating the second output bases according to the vector trend and R,G,B distribution relationship in the standard reference color gamut;

IV. ending process when the re-measured color temperature of the color display device approximates a preset allowance range, otherwise proceeding the next step; and V. outputting the calibrated second output bases to the color display device, and repeating the previous process.

7. The method of claim 6 further including steps of setting the second output bases as the RGB first output bases of the objective color temperature, and writing the first output bases into a color profile of the color display device.

8. An apparatus for calibrating color temperature of color display devices according to claim 1, comprising:

a colorimeter for obtaining the current color temperature of the color display device, outputting the second color coordinate corresponding to the measured color temperature according to the standard reference color gamut;

a data processing unit for outputting the known R,G, B second output bases values to the color display device and according to the objective color temperature to be calibrated to obtain the first color coordinate corresponding to the same objective color temperature in the same standard reference color gamut, and according the aforesaid method_ to process the first color coordinate and the second color coordinate to obtain the first RGB output bases value required for calibrating the color display device to the objective color temperature; and a data writing unit for writing the first output bass values in a color profile of the color display device.

9. The apparatus of claim 8, wherein the standard reference color gamut is a CIE 1931 xyY chromaticity diagram.

10. The apparatus of claim 8, wherein the data processing unit is a computer having built-in processing programs.

11. The apparatus of claim 8, wherein the data processing unit includes a storage unit, an input unit and an output unit.

12. The apparatus of claim 11, wherein the storage unit stores data of the standard reference color gamut and processing data and results of the data processing unit.

13. The apparatus of claim 11, wherein the storage unit is a memory device.

14. The apparatus of claim 11, wherein the storage unit is a hard disk drive.

15. The apparatus of claim 11, wherein the input unit is a keyboard.

16. The apparatus of claim 11, wherein the output unit includes an interface card for driving the color display device and a connector for connecting the color display device.

* * * * *